US012789305B2

(12) United States Patent
Asada et al.

(10) Patent No.: US 12,789,305 B2
(45) Date of Patent: Nov. 10, 2026

(54) MACHINE TOOL

(71) Applicant: DMG MORI CO., LTD., Nara (JP)

(72) Inventors: Tetsushi Asada, Nara (JP); Akihisa Aoyama, Nara (JP); Isao Hikita, Nara (JP)

(73) Assignee: DMG MORI CO., LTD., Nara (JP)

( * ) Notice: Subject to any disclaimer, the term of this patent is extended or adjusted under 35 U.S.C. 154(b) by 1007 days.

(21) Appl. No.: 18/077,288

(22) Filed: Dec. 8, 2022

(65) Prior Publication Data

US 2023/0103884 A1 Apr. 6, 2023

Related U.S. Application Data

(63) Continuation of application No. PCT/JP2021/020940, filed on Jun. 2, 2021.

(30) Foreign Application Priority Data

Jun. 29, 2020 (JP) ................................ 2020-111067

(51) Int. Cl.
*B23Q 3/155* (2006.01)
*B23B 3/16* (2006.01)
(Continued)

(52) U.S. Cl.
CPC ................ *B23Q 3/155* (2013.01); *B23B 3/16* (2013.01); *B23Q 15/12* (2013.01);
(Continued)

(58) Field of Classification Search
CPC ............. Y10T 483/123; Y10T 483/138; Y10T 483/136; Y10T 483/132; Y10T 483/13;
(Continued)

(56) References Cited

U.S. PATENT DOCUMENTS

| | | | | |
|---|---|---|---|---|
| 4,577,389 A * | 3/1986 | Shultz | B23Q 3/15513 | |
| | | | 82/159 | |
| 12,654,268 B2 * | 6/2026 | Hikita | B23Q 3/15539 | |

FOREIGN PATENT DOCUMENTS

| | | |
|---|---|---|
| JP | S62-236642 A | 10/1987 |
| JP | 2000-218459 A | 8/2000 |
| JP | 2008-225738 A | 9/2008 |

OTHER PUBLICATIONS

Machine Translation JP 62-236642 A, which JP '642 was published Oct. 16, 1987.*

* cited by examiner

*Primary Examiner* — Erica E Cadugan
(74) *Attorney, Agent, or Firm* — IP Business Solutions, LLC

(57) ABSTRACT

A machine tool includes a turret including first and second stations, a tool storage unit capable of storing tools therein, a machining control unit for controlling a tool in accordance with a machining program, a tool changing unit for replacing the tool attached to the turret with a tool stored in the tool storage unit, and a tool pattern memory for memorizing, as a first tool pattern, a combination of tools at the first and second stations which is associated with a first part of the machining program and, as a second tool pattern, a combination of tools at the first and second stations which is associated with a second part of the machining program after the first part. When machining is stopped during execution of the second part, the tool changing unit changes tools in accordance with a past tool pattern saved in association with a part before stop on the machining program.

5 Claims, 10 Drawing Sheets

(51) Int. Cl.
*B23Q 15/12* (2006.01)
*B23Q 3/157* (2006.01)

(52) U.S. Cl.
CPC ............ *B23Q 2003/155418* (2016.11); *B23Q 2003/155428* (2016.11); *B23Q 2003/155439* (2016.11); *B23Q 2003/155442* (2016.11); *B23Q 2003/155446* (2016.11); *B23Q 2003/15586* (2013.01); *B23Q 3/15722* (2016.11); *Y10T 483/123* (2015.01); *Y10T 483/138* (2015.01); *Y10T 483/1721* (2015.01)

(58) Field of Classification Search
CPC ..... Y10T 29/5152–5167; Y10T 29/519; Y10T 82/2587; Y10T 408/37; Y10T 82/2506–2508; Y10T 483/10; B23Q 2003/15586; B23Q 3/155–3/15793; B23Q 15/12; B23Q 2220/002; B23B 29/24–29/34; B23B 39/20–39/205; B23B 3/16–3/265; B23B 3/15503; G05B 19/4061; G05B 2219/50204; G05B 2219/35316; G05B 19/40938
USPC ........ 483/5, 11, 10, 8, 7, 1; 29/35.5–48.5 A, 29/33 J; 82/159, 120–121; 408/35; 700/179
See application file for complete search history.

FIG. 8

142

| TOOL REST | S1 | S2 | S3 | S4 | S5 | S6 | S7 | S8 | S9 | S10 | S11 | S12 |
|---|---|---|---|---|---|---|---|---|---|---|---|---|
| | T1 | T23 | T2 | T9 | T20 | T24 | T3 | T29 | T16 | T5 | T19 | T18 |

| PROGRAM | B1249 |
|---|---|

144

146

| PATTERN | S1 | S2 | S3 | S4 | S5 | S6 | S7 | S8 | S9 | S10 | S11 | S12 |
|---|---|---|---|---|---|---|---|---|---|---|---|---|
| V1 | T3 | T7 | T1 | T6 | T4 | T17 | T18 | T19 | T2 | T11 | T9 | T22 |
| V2 | – | – | – | – | – | – | – | – | – | – | – | – |
| V3 | – | – | – | – | – | – | – | – | – | – | – | – |
| V4 | T2 | T6 | T7 | T18 | T20 | T3 | T4 | T11 | T21 | T5 | T22 | T9 |
| V5 | T2 | T3 | T13 | T12 | T14 | T4 | T5 | T6 | T15 | T11 | T10 | T8 |
| V6 | – | – | – | – | – | – | – | – | – | – | – | – |
| V7 | T1 | T2 | T3 | T7 | T13 | T4 | T12 | T5 | T11 | T6 | T10 | T14 |
| V8 | – | – | – | – | – | – | – | – | – | – | – | – |
| V9 | – | – | – | – | – | – | – | – | – | – | – | – |
| V10 | – | – | – | – | – | – | – | – | – | – | – | – |
| V11 | – | – | – | – | – | – | – | – | – | – | – | – |
| V12 | – | – | – | – | – | – | – | – | – | – | – | – |

140

150

MACHINE TOOL

BACKGROUND OF INVENTION

1. Field

The present invention relates to a technology for tool change in machine tools.

2. Description of Related Art

Machine tools include a device that cuts a workpiece into a desired shape and a device that stacks metal powder or the like to form a workpiece. Examples of the machine tool that performs cutting include a turning center that brings a cutting tool into contact with a rotating workpiece to machine the workpiece, a machining center that brings a rotating cutting tool into contact with a workpiece to machine the workpiece, and a combined machine having these functions in a combined manner.

In a machine tool including a tool rest, a plurality of tools may be attached to the tool rest. The machine tool machines a workpiece while moving the tool rest (turret base) three-dimensionally and selecting a tool to be applied to the workpiece from the tools attached to the tool rest in accordance with a machining program prepared in advance.

Some machine tools include an external tool storage unit that has a number of tools stored therein. When a necessary tool is not attached to the tool rest, the machine tool attaches a specified tool to the tool rest from the tool storage unit and continues machining of the workpiece. Hereinafter, a tool attached to the tool rest is referred to as a “work tool”, and a tool stored in the tool storage unit is referred to as a “spare tool”. Unless otherwise specified, they are simply referred to as a “tool”. Further, attaching a spare tool to the tool rest as a work tool is referred to as “tool change” (see Patent Literatures 1 and 2).

Related Art List

Patent Literature 1: JP 2008-225738 A

Patent Literature 2: JP 2000-218459 A

A machine tool may forcibly stop machining work in response to various abnormal events and the like having occurred during machining of a workpiece. In this case, an operator checks the status of the machine tool and the work status and then re-executes a machining program.

In another case, the operator wants to repeat only a part of processes included in the machining program. In general, a process of machining a workpiece includes a rough process that roughly cuts the workpiece and a finishing process that cuts the roughly cut workpiece so as to polish the workpiece. The operator may want to repeat only the finishing process, depending on the machining state of the workpiece.

As described above, the machine tool machines a workpiece while changing a work tool and a spare tool as needed. Therefore, when the machining program is re-executed, there is a possibility that a combination (hereinafter, a “tool pattern”) of work tools attached to the tool rest has changed from a tool pattern in previous execution of the machining program.

When the tool rest is three-dimensionally moved in a narrow machining chamber, it is necessary to execute control in such a manner that the work tool does not come into contact with the workpiece itself or external equipment such as a tailstock (tailstock device) for supporting the workpiece or an anti-vibration device. Since there are various shapes and sizes of tools, even in the same machining process, there are cases where contact does not occur for a certain tool pattern but occurs for another tool pattern.

SUMMARY OF INVENTION

A machine tool according to an aspect of the present invention includes: a turret having a plurality of stations including first and second stations at each of which a tool is able to be attached; a tool storage unit capable of storing a plurality of tools therein; a machining control unit for controlling a tool attached to the turret in accordance with a machining program, to machine a workpiece; a tool changing unit for replacing the tool attached to the turret with a tool stored in the tool storage unit; and a tool pattern memory for memorizing, as a first tool pattern, a combination of tools attached at the first and second stations which is associated with a first part of the machining program and memorizing, as a second tool pattern, a combination of tools attached at the first and second stations which is associated with a second part of the machining program after the first part.

When machining work is stopped during execution of the second part, the tool changing unit performs tool change in accordance with a past tool pattern that is saved to be associated with a part of the machining program before a time of stop on the machining program.

A machine tool according to another aspect of the present invention includes: a turret having a station at which a tool is able to be attached; a tool storage unit capable of storing a plurality of tools therein; a machining control unit for controlling a tool attached to the turret in accordance with a machining program, to machine a workpiece; and a tool changing unit for replacing the tool attached to the turret with a tool stored in the tool storage unit.

The machining program includes a station tool code that is a command instructing to memorize a tool pattern.

In a case where execution of the machining program is interrupted in middle of the machining program and thereafter the machining program is resumed from a point of interruption, the machining control unit reads the station tool code and, when a tool corresponding to the station tool code is not attached at the station, the tool changing unit performs tool change in accordance with a past tool pattern saved in advance before the point of interruption.

According to the present invention, it becomes possible to memorize a tool pattern attached to a turret when a machining program is executed.

BRIEF DESCRIPTION OF DRAWINGS

FIG. 8 is a diagram of a tool pattern screen;

DETAILED DESCRIPTION

A machine tool in the present embodiment is a turning center or a combined machine. First, the structure of a machine tool is mainly described with reference to FIGS. 1 to 4. Details of control of tool change in the present embodiment are described with reference to FIG. 5 and subsequent drawings.

Figure 1:
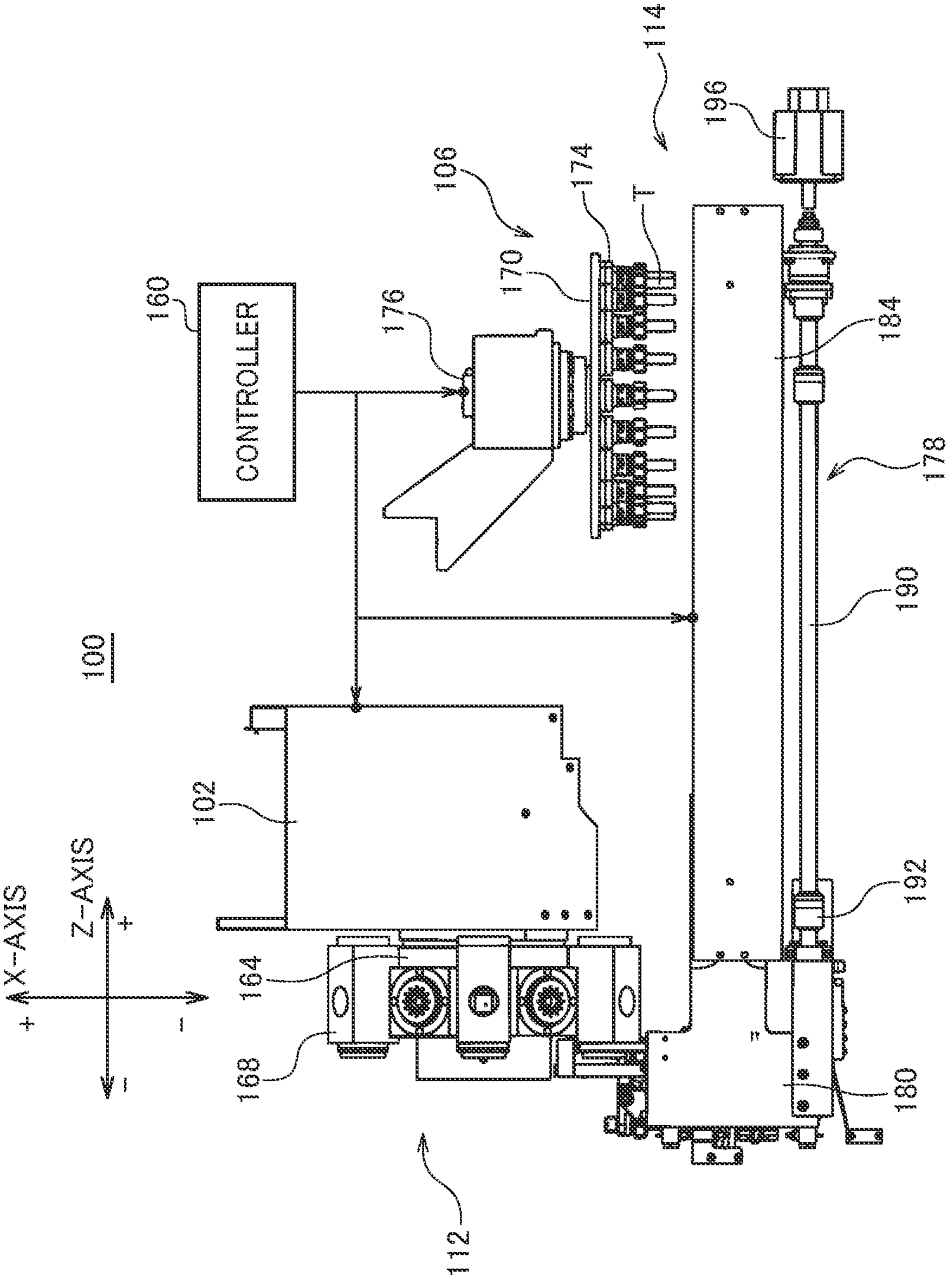
FIG. 1 is a plan view illustrating a schematic configuration of a machine tool in an embodiment of the present invention.

FIG. 1 is a plan view illustrating a schematic configuration of a machine tool 100 in the present embodiment.

The machine tool 100 includes a controller 160, machining equipment 112, a tool changing unit 114, and a tool storage unit 106. The controller 160 corresponds to an information processing device 118 and a machining control unit 116 described later with reference to FIG. 6. A turret base 102 and a turret 164 are movable in the X, Y, and Z-axis directions. The turret base 102 and the turret 164 may be collectively referred to as a tool rest, and only the turret 164 may be referred to as a tool rest. FIG. 1 is a plan view in an X-Z plane. The turret 164 is disposed on the turret base 102 to be rotatable about the Z-axis. The tool storage unit 106 (a tool magazine) is provided on the positive side in the Z-axis direction of the turret base 102. The tool changing unit 114 transfers a tool T.

Figure 2:
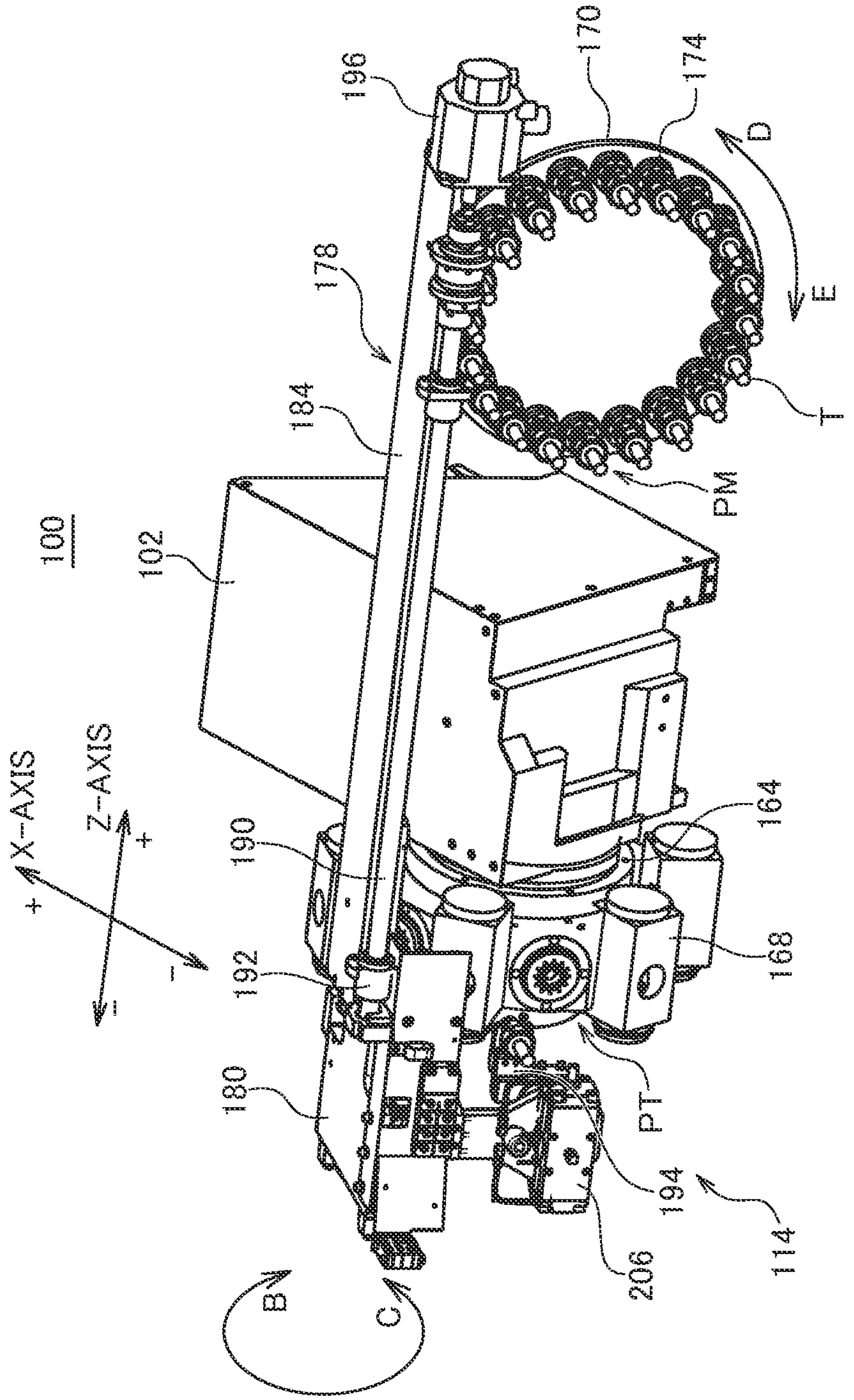
FIG. 2 is a perspective view of the machine tool.

FIG. 2 is a perspective view of the machine tool 100.

The turret 164 in the shape of a prism has a plurality of holders 168 for holding tools T on its outer peripheral plane. The holders 168 are attached to a turret body to be detachable. The tool T attached to the holder 168 at a position PT is the target of attachment and detachment. By rotating the turret 164 in a direction of an arrow B-C (a direction of rotation about the Z-axis), each holder 168 can be indexed to the attachment/detachment position PT.

The tool storage unit 106 includes a holding plate 170 provided to be rotatable in a direction of an arrow D-E (a direction of rotation about the X-axis), holding pots 174 arranged at regular intervals on the peripheral edge of the holding plate 170, and a driving motor 176 (see FIG. 3) that rotates the holding plate 170. The holding pot 174 holds the tool T. The holding pot 174 protrudes to the negative side in the X-axis direction. The tool T in the holding pot 174 at a position PM is the target of attachment and detachment. The driving motor 176 rotates the holding plate 170, whereby each holding pot 174 can be indexed to the attachment/detachment position PM.

Figure 3:
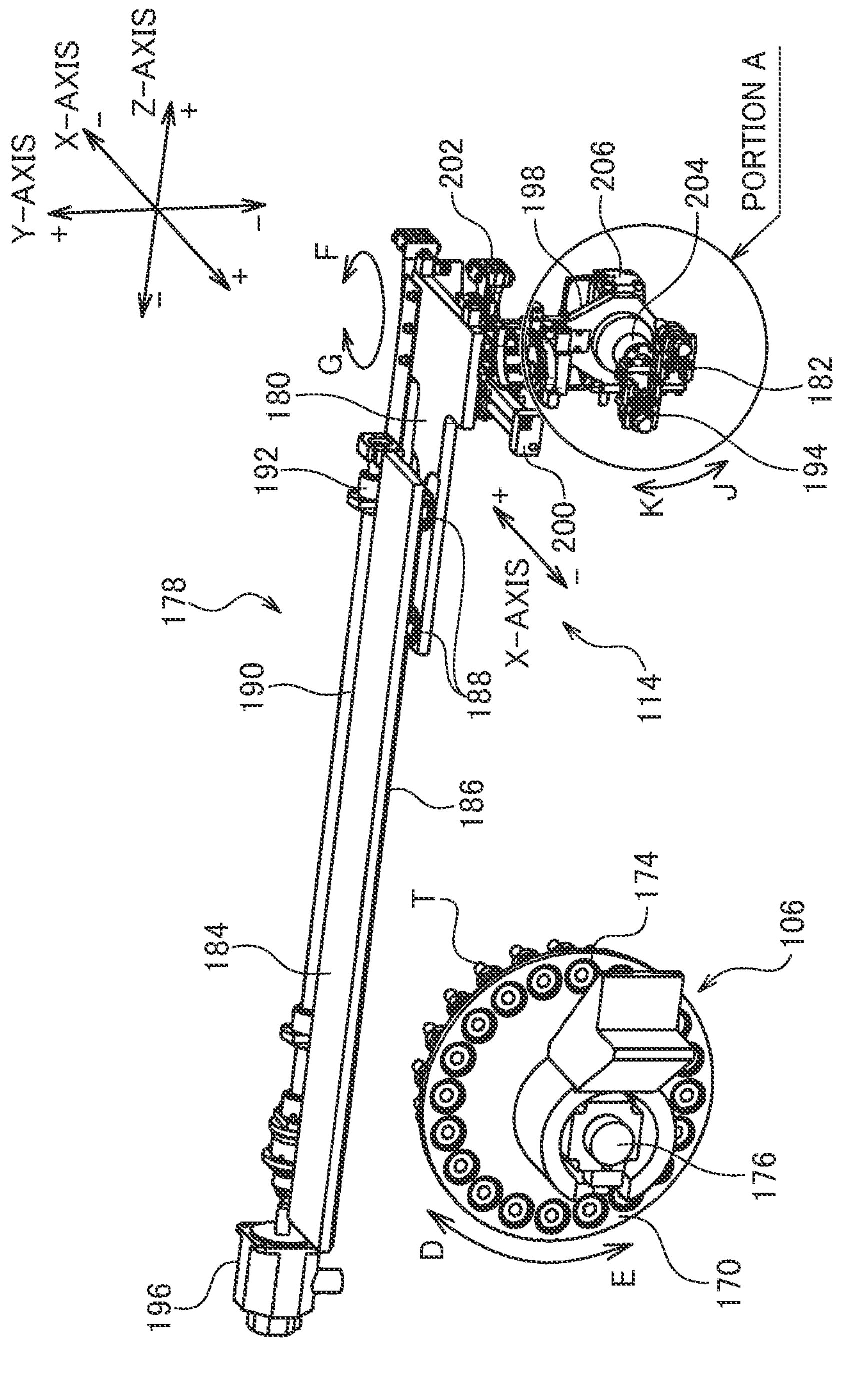
FIG. 3 is a perspective view of a tool storage unit and a tool changing unit.

FIG. 3 is a perspective view of the tool storage unit 106 and the tool changing unit 114.

The tool changing unit 114 is provided on the negative side in the X-axis direction of the turret base 102 and the tool storage unit 106 (see FIG. 1). The tool changing unit 114 includes a feed mechanism 178 provided along the Z-axis, a movable base 180 that can be moved along the Z-axis by the feed mechanism 178, and a first hand 182 and a second hand 194 attached to the movable base 180, for example.

The feed mechanism 178 includes a rail holding base 184 arranged parallel to the Z-axis, two guide rails 186 attached to a lower surface of the rail holding base 184 to be parallel to the Z-axis, two sliders 188 provided for each guide rail 186 to engage with that guide rail 186, a ball screw 190 arranged along the rail holding base 184, a ball nut 192 screwed to the ball screw 190, and a servo motor 196 coupled to an end of the ball screw 190 to rotate the ball screw 190 about an axis line. The sliders 188 are fixed to an upper surface of the movable base 180.

On a lower surface of the moving base 180, a holding member 198 is arranged to be rotatable in a direction of an arrow F-G (a direction of rotation about the Y-axis) and movable in the X-axis direction. The holding member 198 is driven in the X-axis direction by a moving cylinder 200. The holding member 198 is driven by a driving cylinder 202 via a mechanism such as a rack and pinion mechanism, and turns in the direction of the arrow F-G within an angular range of 90 degrees. That is, the holding member 198 is configured to be movable on an X-Z plane and rotatable in the F-G direction. FIG. 3 illustrates a state in which the holding member 198 has been rotated in the F direction.

A rotating shaft 204 is attached to the holding member 198 to penetrate therethrough. The rotating shaft 204 is driven by a driving cylinder 206 via a mechanism such as a rack and pinion mechanism, and rotates in a direction of an arrow J-K within an angular range of 180 degrees.

Figure 4:
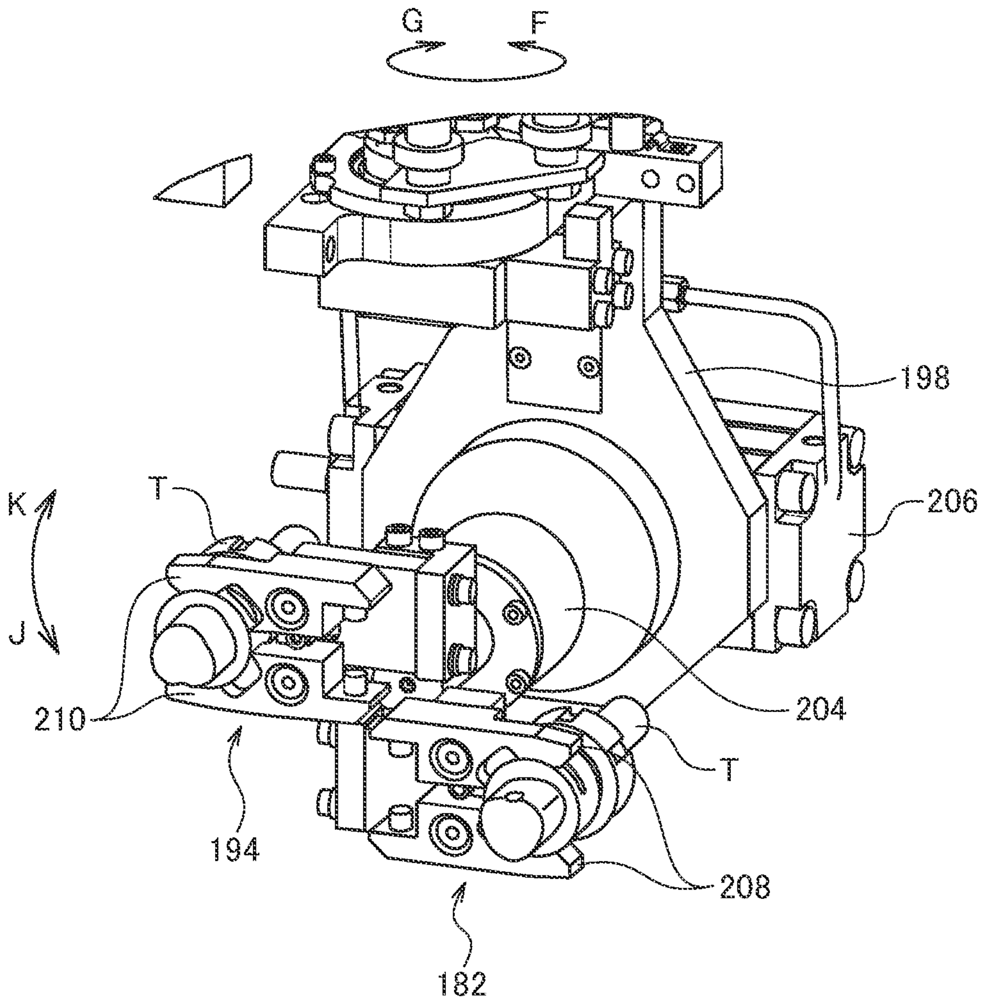
FIG. 4 is an enlarged perspective view of a portion A illustrated in FIG. 3.

FIG. 4 is an enlarged perspective view of a portion A illustrated in FIG. 3.

The first hand 182 and the second hand 194 are attached to an end of the rotating shaft 204 to be point-symmetric with respect to the axis center of the rotating shaft 204 and be parallel to each other in a vertical direction. The first hand 182 and the second hand 194 have the same configuration as each other. The first hand 182 has a pair of gripping claws 208 for gripping the tool T and can grip the tool T with the gripping claws 208. Similarly, the second hand 194 also has a pair of gripping claws 210 and can grip the tool T with the gripping claws 210.

When the holding member 198 is rotated to the direction of the arrow F (the rotation state illustrated in FIGS. 3 and 4), the gripping claws 208 and 210 of the first and second hands 182 and 194 each have such a posture that it is along the Z-axis direction (an orthogonal direction orthogonal to the axis line direction of the tool T gripped by the gripping claws 208 or the like). When the holding member 198 is rotated to the direction of the arrow G, the gripping claws 208 and 210 of the first and second hands 182 and 194 each have such a posture that it is along the X-axis direction.

When the holding member 198 is at an end of movement on the positive side in the X-axis direction (this position is referred to as a “first X position”) and at an end of rotation in the F direction, the tool T held in the holding pot 174 indexed to the attachment/detachment position PM can be gripped by the first hand 182 or the second hand 194.

Further, when the first hand 182 grips the tool T on its upper side and no tool T is held in the holding pot 174 at the attachment/detachment position PM, the tool T gripped by the first hand 182 can be accommodated in the holding pot 174 (an empty holding pot) at the attachment/detachment position PM.

It is assumed that the movable base 180 is located at an intermediate position between the turret 164 and the tool storage unit 106. Here, the holding member 198 is moved to an end of movement on the negative side in the X-axis direction (this position is referred to as a “second X position”) and rotated to the end of rotation in the direction of the arrow F. Next, the movable base 180 is moved to the positive side in the Z-axis direction, and the axis center (the X-axis direction) of the tool T gripped by the first hand 182 is made to coincide with the axis center of the holding pot 174 (the Z coordinate at this time is referred to as a “first Z position”). Subsequently, the holding member 198 is moved to the positive side in the X-axis direction to the “first X position”, and the tool T in the first hand 182 is attached to the empty holding pot 174 at the attachment/detachment position PM. Thereafter, the movable base 180 is moved to the negative side in the Z-axis direction (this position is referred to as a "second Z position"), whereby gripping of the tool T by the first hand 182 is released.

Meanwhile, when the first hand 182 is located on the upper side, no tool T is gripped by the gripping claws 208 of the first hand 182, and the tool T is held at the attachment/detachment position PM, the tool T at the attachment/detachment position PM can be taken out by the first hand 182.

It is assumed that the movable base 180 is located at an intermediate position between the turret 164 and the tool storage unit 106. Here, after the holding member 198 is rotated to the end of rotation in the direction of the arrow F (the rotation state illustrated in FIGS. 3 and 4) and the movable base 180 is moved to the "second Z position", the movable base 180 is moved to the "first X position" and then moved to the aforementioned "first Z position". Accordingly, the tool T attached at the attachment/detachment position PM enters to an opening of the pair of gripping claws 208 and is gripped by the gripping claws 208. Next, the holding member 198 is moved to the "second X position". The tool T attached to the holding pot 174 is thus taken out from the holding pot 174 while being gripped by the pair of gripping claws 208.

As for the turret 164, in a case where the holder 168 indexed to the attachment/detachment position PT is of a type that holds the tool T along a radial direction, the tool T held in the holder 168 can be gripped by the first hand 182 or the second hand 194 positioned on the lower side when the holding member 198 of the tool changing unit 114 is at the "first X position" and at the end of rotation in the direction of the arrow F.

When the first hand 182 is positioned on the upper side, the second hand 194 is positioned on the lower side, the first hand 182 grips the tool T, the second hand 194 does not grip the tool T, and the tool T is held at the attachment/detachment position PT, it is possible to change the tool T gripped by the first hand 182 with the tool T held in the holder 168 at the attachment/detachment position PT.

It is assumed that the movable base 180 is located at an intermediate position between the turret 164 and the tool storage unit 106. Here, the holding member 198 is rotated to the end of rotation in the direction of the arrow F and is moved to the "second X position". In this state, the movable base 180 is moved to a predetermined position (this position is referred to as a "third Z position") set in the negative side in the Z-axis direction. The "third Z position" is located at such a position that, when the holding member 198 is moved to the "first X position", the second hand 194 positioned on the lower side is located on the positive side in the Z-axis direction of the tool T held in the holder 168, in other words, at a front position at which the second hand 194 does not interfere with the tool T.

After the holding member 198 is moved to the "first X position", the movable base 180 is moved to a predetermined position (this position is referred to as a "fourth Z position") set in the negative side in the Z-axis direction. Accordingly, the tool T at the attachment/detachment position PT enters an opening of the pair of gripping claws 210 and is gripped by the gripping claws 210. Next, when the holding member 198 is moved to the "second X position", the tool T attached to the holder 168 is taken out from the holder 168 by the pair of gripping claws 210.

Next, the driving cylinder 206 turns the first and second hands 182 and 194 upside down to position the second hand 194 on the upper side and position the first hand 182 on the lower side, and moves the holding member 198 to the "first X position". Accordingly, the tool T gripped by the first hand 182 is disposed at the attachment/detachment position PT. Subsequently, when the movable base 180 is moved to the "third Z position", gripping of the tool T by the first hand 182 is released. By the first change operation described above, the tool T gripped by the first hand 182 and the tool T at the attachment/detachment position PT are changed with each other. The tool T gripped by the second hand 194 can be accommodated in the tool storage unit 106 by the accommodating operation described above.

In a case where the holder 168 indexed to the attachment/detachment position PT of the turret 164 is of a type that holds the tool T along the Z-axis, the tool T held in this holder 168 can be gripped by the first hand 182 or the second hand 194 positioned on the lower side, when the holding member 198 is at an end of rotation in the direction of the arrow G and at the "first X position".

When the first hand 182 is positioned on the upper side, the second hand 194 is positioned on the lower side, the second hand 182 grips the tool T, the second hand 194 does not grip the tool T, and the tool T is held at the attachment/detachment position PT, it is possible to change the tool T gripped by the first hand 182 with the tool T at the attachment/detachment position PT.

It is assumed that the movable base 180 is located at an intermediate position between the turret 164 and the tool storage unit 106. Here, the holding member 198 is rotated to the end of rotation in the direction of the arrow G and is moved to the "second X position", and the movable base 180 is moved to the "third Z position" set in the negative side in the Z-axis direction. At this time, the second hand 194 is located at such a position that it can grip the tool T held in the holder 168.

Next, the holding member 198 is moved to the "first X position". The tool T at the attachment/detachment position PT thus enters the opening of the pair of gripping claws 210 and is gripped by the gripping claws 210. Thereafter, when the holding member 198 is moved to the "fourth Z position" set on the negative side in the Z-axis direction, the tool T attached to the holder 168 is taken out from the holder 168 by the pair of gripping claws 210.

Next, the driving cylinder 206 turns the first and second hands 182 and 194 upside down to position the second hand 194 on the upper side and position the first hand 182 on the lower side, and moves the movable base 180 to the "third Z position". Accordingly, the tool T gripped by the first hand 182 is attached at the attachment/detachment position PT. Subsequently, when the holding member 198 is moved to the "second X position", gripping of the tool T by the first hand 182 is released. By the second change operation described above, the tool T gripped by the second hand 182 and the tool T at the attachment/detachment position PT are changed with each other. The tool T gripped by the second hand 194 can be accommodated in the tool storage unit 106 by the accommodating operation described above.

Next, saving and restoring a tool pattern are described.

Figure 5:
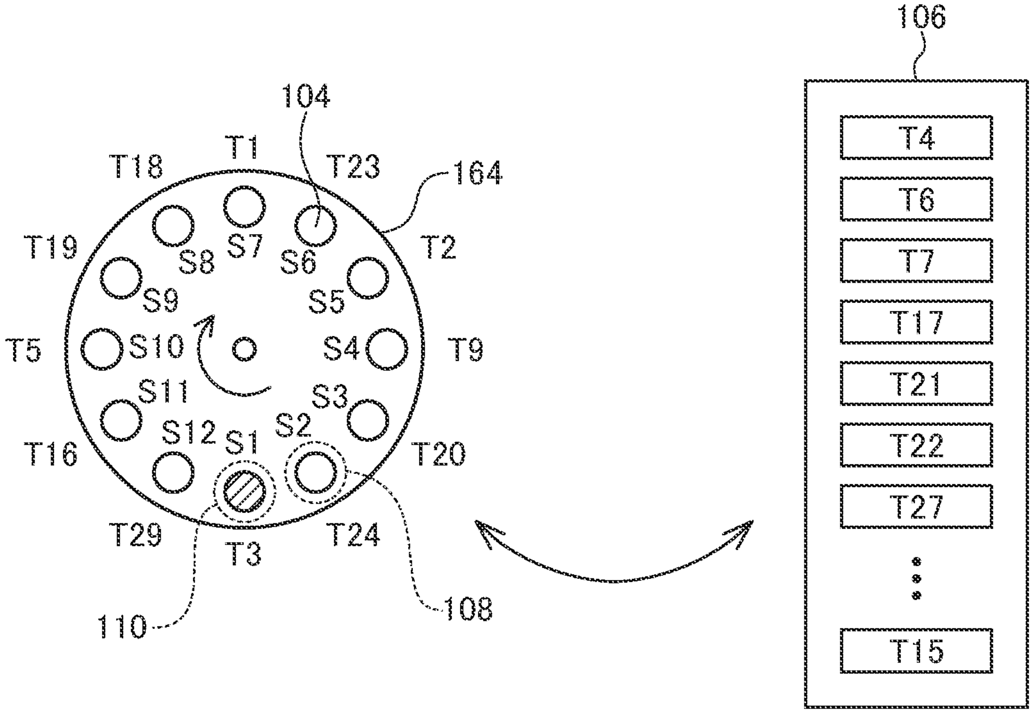
FIG. 5 is a schematic diagram for explaining tool change in a tool rest.

FIG. 5 is a schematic diagram for explaining tool change in the turret 164.

As described above, the turret base 102 of a machine tool includes the turret 164 that is rotatable. The turret 164 can rotate about the center axis. The turret 164 includes 12 stations 104 (S1 to S12) at each of which the holder 168 can be set, as tool attaching positions. A work tool is attached at each station 104. For example, in a case where the holder 168 has a form that allows two tools to be attached thereto, two tools can be attached at one station.

The shape and the size of the tool may vary. The tool is attached to the holder 168, and the holder 168 is attached at the station 104. The machine tool identifies each tool by a tool number. In FIG. 5, a work tool having a tool number T3 (hereinafter, a "work tool (T3)") is attached at a station 104 corresponding to a station number S1 (hereinafter, a "station 104 (S1)"). Similarly, a work tool (T24) is attached at a station 104 (S2), and a work tool (T20) is attached at a station 104 (S3).

The turret base 102 machines a workpiece with a work tool corresponding to a predetermined machining position 110. In FIG. 5, the workpiece is machined by the work tool (T3) located at the machining position 110 (the station 104 (S1)). The machine tool moves the turret base 102 and the turret 164 and applies the work tool (T3) to a predetermined position of the workpiece at a predetermined angle, thereby machining the workpiece. When the workpiece is to be machined by another work tool (T24), the machine tool 100 rotates the turret 164 to set the work tool (T24) at the machining position 110.

A work tool corresponding to a change position 108 is the target of tool change. The machine tool generally includes the tool storage unit 106 that is also called a tool magazine. Many spare tools are stored in the tool storage unit 106. For example, when a spare tool (T4) is attached to the turret base 102, the machine tool stores the work tool (T24) attached at the change position 108 (the station (S2)) in the tool storage unit 106 and attaches the spare tool (T4) at the station 104 (S2) corresponding to the change position 108.

As described above, the machine tool machines a workpiece while moving the turret base 102 to change the relative distance and the relative angle between the workpiece and a work tool. Further, the machine tool 100 selects a work tool that is actually used for machining the workpiece from 12 work tools by rotating the turret 164. The work tool and a spare tool can be changed with each other at any time. If a large number of spare tools are stored in the tool storage unit 106 having a large capacity, various types of machining can be realized by one machine tool. On the other hand, if 12 types of tools that are relatively frequently used are attached to the turret 164, it is possible to reduce loss of time involved in tool change.

The machine tool machines a workpiece while repeating tool change in accordance with a machining program. Therefore, a combination of work tools in the turret 164, that is, a tool pattern changes in a complicated manner. The tool pattern referred to here is information specifying the arrangement of one or more tools to be attached to the turret 164 having the plural holders 168. When the turret base 102 is moved in a machining space, it is necessary to create a machining program so as to prevent contact of the work tools attached to the turret 164 with a tailstock or the like. Hereinafter, an event in which a work tool unintentionally comes into contact with a workpiece or external equipment such as a tailstock is referred to as "interference". Due to a large variety of sizes and shapes of tools, it is very difficult to predict in advance under what circumstances interference will occur.

For example, it is assumed that no interference occurs when a finishing process A, which is a part of a machining process, is executed using a tool pattern V1. However, interference may occur if the same finishing process A is executed again. This is because the tool pattern V1 at the start of the first finishing process A is different from a tool pattern V2 at the start of the second finishing process A. At the start of the second finishing process A, a large work tool (TX) is attached to the turret 164, and this work tool (TX) may interfere when the turret base 102 is moved. As described above, even if the turret base 102 is moved in exactly the same manner, interference may or may not occur depending on the tool pattern. In the future, in order to miniaturize the machine tool, it is necessary to operate the turret base 102 in a narrow machining chamber, which may increase the risk of occurrence of interference.

Therefore, in the present embodiment, a tool pattern for which interference does not occur is memorized, and this "safe tool pattern" is reproduced and then a machining process is resumed or re-executed, whereby the risk of interference is reduced.

Figure 6:
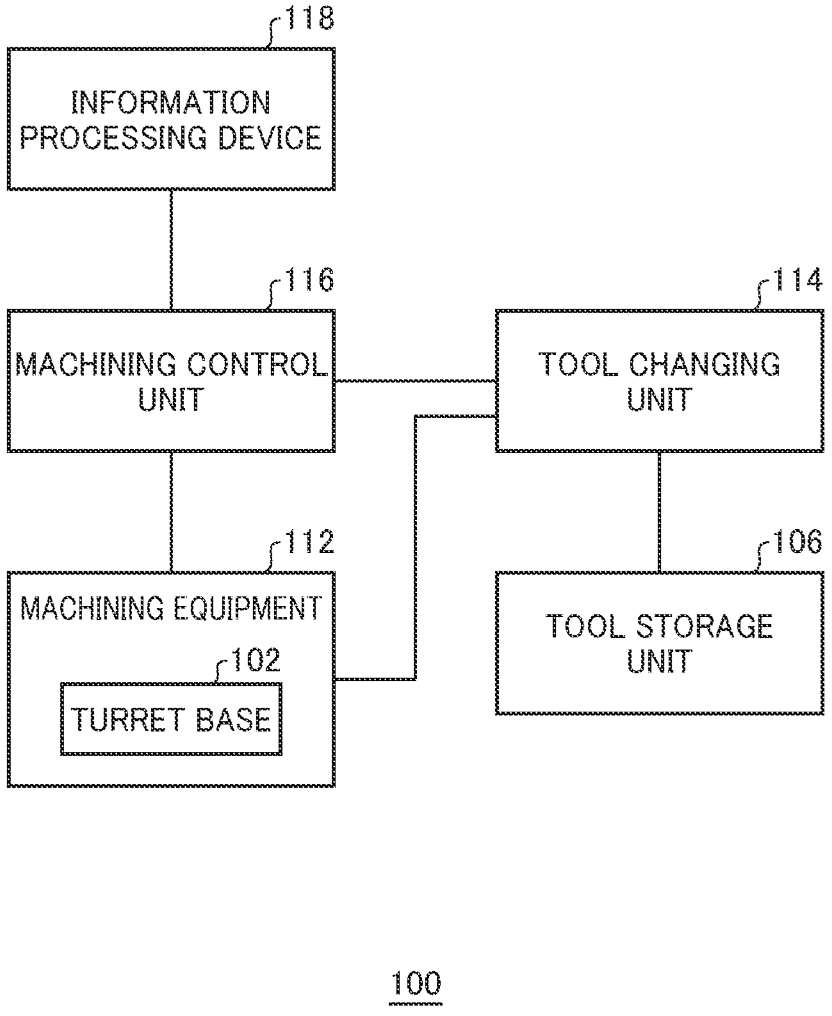
FIG. 6 is a hardware configuration diagram of the machine tool.

FIG. 6 is a hardware configuration diagram of the machine tool 100.

The machine tool 100 includes the information processing device 118, the machining control unit 116, the machining equipment 112, the tool changing unit 114, and the tool storage unit 106. The machining control unit 116 functioning as a numerical controller transmits a control signal to the machining equipment 112 in accordance with a machining program. The machining equipment 112 moves the turret base 102 to machine a workpiece in accordance with an instruction from the machining control unit 116. Further, the machining control unit 116 acquires a tool pattern in the turret base 102 from a tool information management unit 130 (described later).

The information processing device 118 controls the machining control unit 116. In the present embodiment, the information processing device 118 provides a user interface function to an operator and manages tool patterns. The tool storage unit 106 stores spare tools therein. The tool changing unit 114 corresponds to a so-called ATC (Automatic Tool Changer). The tool changing unit 114 takes out a spare tool from the tool storage unit 106 and changes a work tool located at the change position 108 of the turret base 102 with the spare tool in accordance with a change instruction from the machining control unit 116.

Figure 7:
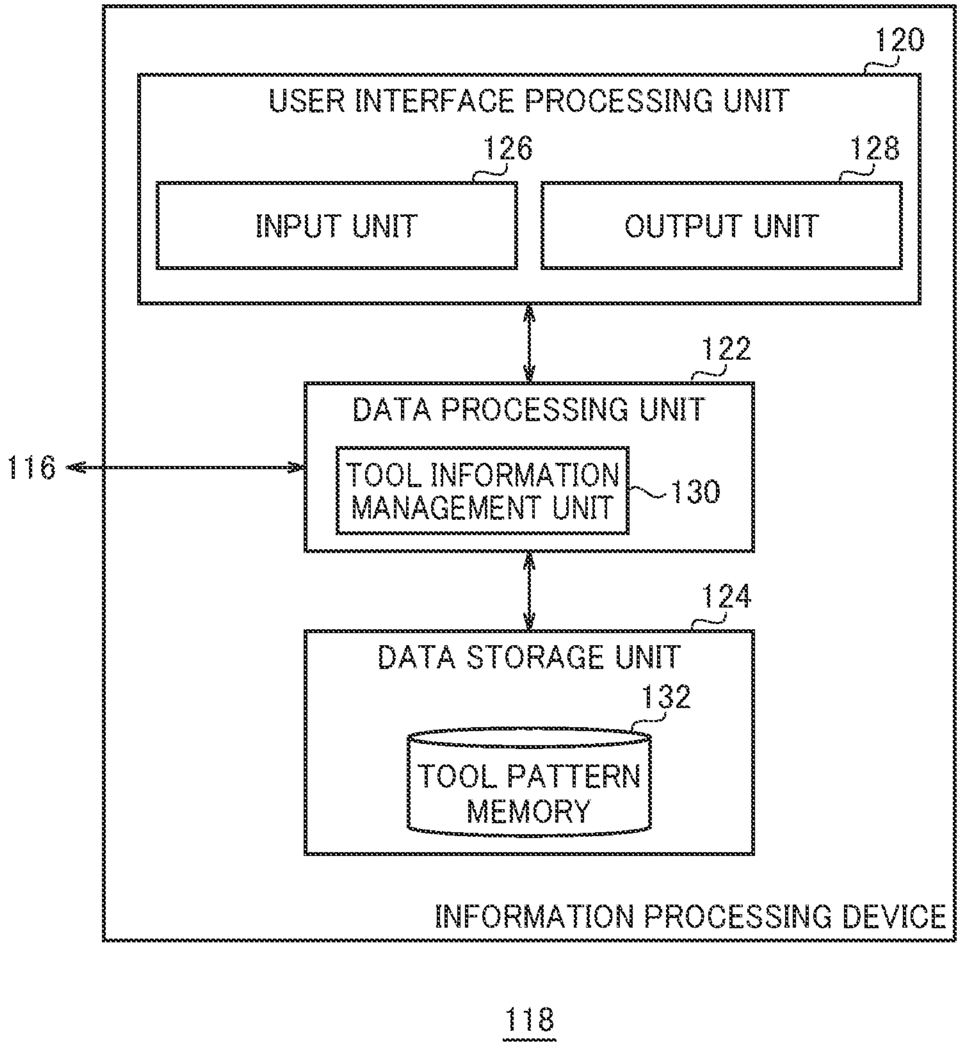
FIG. 7 is a functional block diagram of an information processing device.

FIG. 7 is a functional block diagram of the information processing device 118.

The components of the information processing device 118 are implemented by hardware including computing units such as CPUs (Central Processing Unit) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks that are described below do not refer to configurations in units of hardware but to blocks in units of functions.

Note that the machining control unit 116 may also be implemented by hardware including computing units such as processors, storage devices such as memories and storages, and wired or wireless communication lines that connect these units and devices, and software and programs that are stored in the storage devices and supply processing instructions to the computing units, which are executed on operation systems separate from the information processing device 118.

The information processing device 118 includes a user interface processing unit 120, a data processing unit 122, and a data storage unit 124.

The user interface processing unit 120 receives an operation made by a user and performs user-interface-related processing such as displaying an image and outputting audio. The data processing unit 122 performs various type of processing on the basis of data acquired by the user interface processing unit 120 and data stored in the data storage unit 124. The data processing unit 122 also functions as an interface of the user interface processing unit 120 and the data storage unit 124. The data storage unit 124 stores various types of programs and setting data therein.

The user interface processing unit 120 includes an input unit 126 and an output unit 128.

The input unit 126 receives input made by the user via a touch panel or a hardware device such as a handle. The output unit 128 provides various types of information to the user by displaying an image or outputting audio.

The data processing unit 122 includes the tool information management unit 130. The tool information management unit 130 controls saving and restoring a tool pattern (described later).

The data storage unit 124 includes a tool pattern memory 132. The tool pattern memory 132 saves a tool pattern for each machining program therein.

In the following description, among tool patterns, a combination of work tools actually attached to the turret 164 is called a "current pattern", and a tool pattern memorized in the tool pattern memory 132 as a combination of work tools currently not attached to the turret 164 is called a "saved pattern". When both the above patterns need not be distinguished from each other, they are simply called "tool patterns".

FIG. 8 is a diagram of a tool pattern screen 140.

The tool pattern memory 132 memorizes tool patterns (a current pattern and a saved pattern). The output unit 128 of the information processing device 118 creates the tool pattern screen 140 based on the tool patterns memorized in the tool pattern memory 132 and displays the tool pattern screen 140.

Machining programs are identified by program numbers. A program number region 144 indicates a program number. The tool information management unit 130 manages tool patterns for each machining program. The tool pattern screen 140 in FIG. 8 illustrates tool patterns for a machining program (B1249).

A current pattern region 142 indicates a current pattern as a combination of tool numbers of 12 work tools attached to the turret 164. From FIG. 8, it is found that a work tool (T1) is attached at the station 104 (S1), and a work tool (T23) is attached at the station 104 (S2) (see FIG. 5). The output unit 128 displays the tool pattern screen 140 corresponding to the machining program (B1249) during execution of the machining program (B1249). In addition, an operator can specify the program number "B1249" and cause the tool pattern screen 140 corresponding to the machining program (B1249) to be displayed, even when machining is not performed.

A saved pattern region 146 indicates a list of saved patterns associated with the machining program (B1249). Each saved pattern is identified by its pattern ID. In a machining program, a "station tool code" can be written as a code. By specifying the pattern ID in the station tool code, a current pattern can be memorized as a saved pattern.

For example, it is assumed that the station tool code is "GX". It is also assumed that "GX V2" is described as a "command to memorize a current pattern as a saved pattern (V2)". Upon detection of the station tool code "GX V2" during execution of a machining program, the machining control unit 116 notifies the information processing device 118 of the "current pattern", the "pattern ID=V2", and the "program number=B1249". The tool information management unit 130 of the information processing device 118 causes the tool pattern memory 132 to memorize the notified current pattern as the saved pattern (V2) for the machining program (B1249). By describing a station tool code at a desired position in a machining program, a current pattern at a predetermined timing in a machining process can be memorized in the tool pattern memory 132 as a saved pattern.

The station tool code can also be described in the form of "station tool code, tool number, pattern ID" like "GX T1 VS". This station tool code means that the work tool (T1) is set at the machining position 110 by rotating the turret 164 and a current pattern after this setting is memorized as a saved pattern (V3).

In the machine tool 100 according to the present embodiment, up to 24 saved patterns can be memorized for one machining program.

A saved pattern can be reproduced as a current pattern by a "restoring code". The restoring code can be described in any position of a machining program. For example, it is assumed that the restoring code is "GY". Upon detection of "GY V5" as a "command to reproduce a saved pattern (V5) as a current pattern" during execution of a machining program, the machining control unit 116 notifies the information processing device 118 of the "current pattern", the "pattern ID=V5", and the "program number=B1249". When the current pattern and the saved pattern (V5) do not match each other, the tool information management unit 130 of the information processing device 118 notifies the machining control unit 116 of the saved pattern (V5). The machining control unit 116 reproduces the saved pattern (V5) as a current pattern by instructing the tool changing unit 114 to perform tool change in accordance with the saved pattern (V5).

When the current pattern and the saved pattern (V5) match each other, tool change is not required. Therefore, the tool information management unit 130 instructs the machining control unit 116 to continue working without tool change.

Every time the current pattern is changed by tool change, the machining control unit 116 notifies the information processing device 118 of change of the current pattern. The output unit 128 displays the tool pattern screen 140, and updates the current pattern region 142 in association with tool change. During machining of a workpiece, an operator can confirm the current pattern while confirming the tool pattern screen 140.

A "save key" may be displayed on the tool pattern screen 140. When the operator touches the save key after selecting a pattern ID during machining of a workpiece, the tool information management unit 130 causes the tool pattern memory 132 to memorize the current pattern as a saved pattern associated with the selected pattern ID. The output unit 128 can also output data presented on the tool pattern screen 140 as a file in the form of a table.

Figure 9:
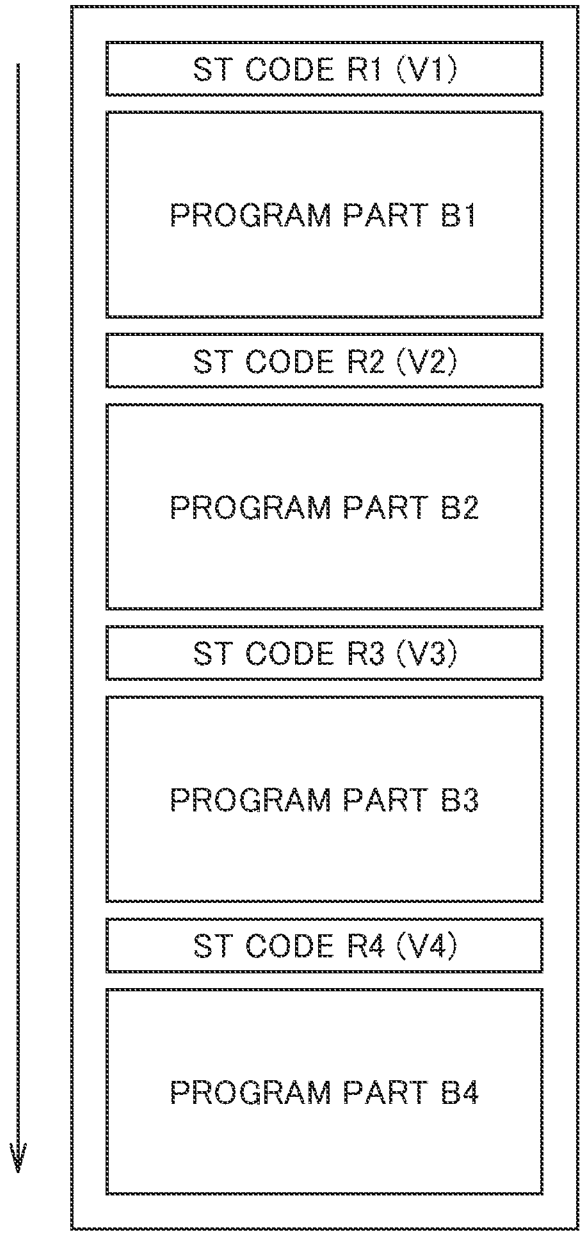
FIG. 9 is a configuration diagram of a machining program.

FIG. 9 is a configuration diagram of a machining program 150.

The machining program 150 includes four program parts B1 to B4. A program part is a unit in machining processes included in the machining program 150. Station tool codes R1 to R4 are described before the respective program parts. In FIG. 9, the "station tool code" is described as "ST code".

When performing machining of a workpiece in accordance with the machining program 150, the machining control unit 116 detects a station tool code R1 (V1) first. The station tool code R1 (V1) is a command to memorize a current pattern as a saved pattern (V1). After the saved pattern (V1) is memorized, the machining control unit 116 executes the program part B1. After execution of the program part B1, a current pattern at that time is memorized as a saved pattern (V2) by a station tool code R2 (V2). Thereafter, a program part B2, a station tool code R3 (V3), a program part B3, a station tool code R4 (V4), and the program part B4 are executed in turn, and the machining program 150 is ended.

Re-execution of only the program part B4 may be wanted after completion of execution of the machining program 150. For example, when the program part B4 is a process of finishing a workpiece, increasing of machining accuracy of the workpiece by re-execution of the finishing process may be wanted. As another case, re-execution of only the program part B4 may be needed because of occurrence of abnormal stop in the middle of execution of the program part B4.

In re-execution of the program part B4, the machining control unit 116 notifies the information processing device 118 of a current pattern and a pattern ID=V4 that are specified by the station tool code R4 (V4) immediately before the program part B4. The tool information management unit 130 of the information processing device 118 reads out a saved pattern (V4) and, when the current pattern and the saved pattern (V4) do not match each other, notifies the machining control unit 116 of the saved pattern (V4). The machining control unit 116 instructs the tool changing unit 114 to reproduce the saved pattern (V4) as a current pattern on the turret base 102. After the saved pattern (V4) is reproduced, the machining control unit 116 starts to execute the program part B4 of the machining program 150.

It is assumed that confirmation has been made that no interference occurs during execution of the program part B4 as long as the tool pattern (V4) is set as the current pattern. Meanwhile, since tool change may occur during execution of the program part B4, a current pattern at the time when the program part B4 is ended or interrupted may be different from the tool pattern (V4) at the time of start of the program part B4.

As an example, a case is considered where although a large work tool (TX) is not included in the tool pattern (V4), the work tool (TX) has become necessary during execution of the program part B4, and tool change has been performed. After execution of the program part B4, the work tool (TX) remains on the turret base 102. When the turret base 102 is moved as it is in order to re-execute the program part B4, the large work tool (TX) may interfere with a tailstock or the like. Accordingly, before re-execution of the program part B4, the saved pattern (V4) is reproduced as a current pattern. In this case, the large work tool (TX) that has been attached to the turret base 102 is stored in the tool storage unit 106. When the program part B4 is re-executed after the tool pattern (V4) is restored, no interference occurs.

A writer of a machining program may explicitly describe a "restoring code to reproduce a preceding saved pattern" in a start line of a program part. In the above example, it suffices that a restoring code "GY V4" is described in the first line of the program part B4. The writer of the machining program 150 may describe any restoring code at any position in the machining program 150.

Alternatively, the machining control unit 116 may be set in advance so as to, when being instructed to re-execute a predetermined program part of the machining program 150 from the information processing device 118, detect a station tool code immediately written before the re-execution point and to automatically reproduce a saved pattern specified by this station tool code.

Further, a current pattern may be memorized as a saved pattern without explicit description of a station tool code. For example, every time a line of code or a predetermined number of lines of codes of the machining program 150 are executed, the machining control unit 116 may notify the information processing device 118 of a current pattern, and the tool information management unit 130 of the information processing device 118 may register the current pattern as a saved pattern. Such a control method enables automatic registration of a saved pattern to be performed in association with execution of the machining program 150 without explicit description of a station tool code made by a writer of the machining program 150.

Figure 10:
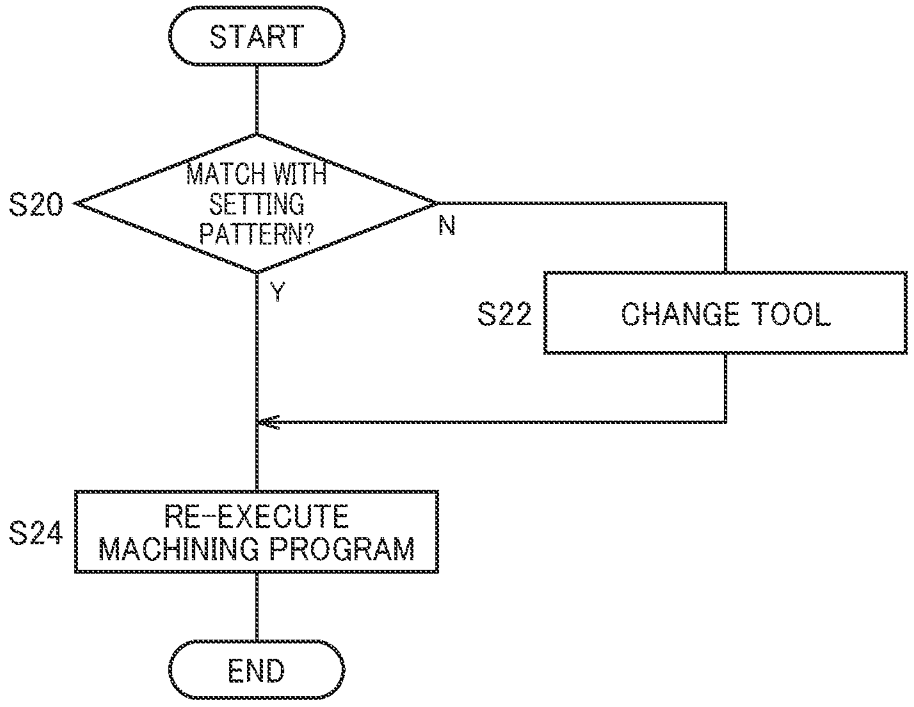
FIG. 10 is a flowchart of a process of restoring a saved pattern.

FIG. 10 is a flowchart of a process of restoring a saved pattern.

When the machining program 150 is re-executed, the machining control unit 116 transmits a current pattern and a pattern ID specified by a station tool code immediately before a re-execution point to the information processing device 118. The tool information management unit 130 of the information processing device 118 determines whether a specified saved pattern and the current pattern match each other (S20). When both match each other (Y at S20), the tool information management unit 130 transmits an execution instruction to the machining control unit 116. Upon receiving the execution instruction, the machining control unit 116 starts re-execution of the machining program 150 (S24).

When both do not match each other (N at S20), the tool information management unit 130 instructs tool change together with the saved pattern (S22). The machining control unit 116 reproduces the saved pattern, and then resumes machining of a workpiece (S24).

In the above description, the machine tool 100 has been described by way of the embodiment.

According to the present embodiment, a current pattern at the time of execution of the machining program 150 can be memorized as a saved pattern. Since a combination of work tools on the turret base 102 can be memorized as the saved pattern at any timing by a station tool code, the machining program 150 can be re-executed after a "safe tool pattern that causes no interference" is reproduced.

Further, in the course of execution of a machining program, a current pattern may be automatically memorized as a saved pattern as appropriate. For example, every time 10 lines of the machine program 150 are executed, a current pattern may be memorized as a saved pattern. In a case of re-executing the machining program 150 from a code in the 25th line, it suffices that the machining control unit 116 reproduces a saved pattern in the 20th line immediately before the re-execution point, as a current pattern.

The present invention is not limited to the embodiments described above and modifications thereof, and any component thereof may be modified and embodied without departing from the scope of the invention. Components described in the embodiments and modifications can be combined as appropriate to form various embodiments. Some components may be omitted from the components presented in the embodiments and modifications.

<Modifications>

The machine tool 100 may have an MDI mode (Manual Data Input Mode) for creating a simple command or program at a work site and instructing execution of it. Hereinafter, a program created by the MDI mode is especially called an "MDI program". The MDI program is a one-time simple program created by the user interface processing unit 120 in many cases, for which a program number is not assigned. In this MDI program, any saved pattern associated with an existing machining program may be restored. For example, a restoring code may be described in the form of "GY B1234 V5" in the MDI program. In this case, the tool information management unit 130 reads out the saved pattern (V5) of a machining program (B1234) and notifies the machining control unit 116 of it. It suffices that the machining control unit 116 instructs the tool changing unit 114 to perform tool change in accordance with the saved pattern (V5) thus notified.

The present embodiment has been explained such that one holder 168 is attached at one station 104, and one work tool is attached to one holder 168. Alternatively, one holder 168 may allow a plurality of work tools, for example, a set of four work tools to be attached thereto. In this case, instead of associating the station 104 and tool numbers with each other as a tool pattern, the station 104 and a set number of a tool set may be associated with each other.

Saving a current pattern may be performed at a timing at which a station tool code is explicitly described and also performed automatically at a predetermined timing, for example, every time 10 lines are executed. Similarly, reproducing a saved pattern may be performed at a timing at which a restoring code is described and also performed automatically at a predetermined timing, for example, at the time when the machining program 150 is executed or resumed.

Machining of a workpiece performed by a machining program is normally represented as a combination of a plurality of processes. A "process" is a unit of work defined in accordance with the content of machining, such as end-face rough machining, outer-diameter rough machining, inner-diameter rough machining, semi-finish machining, and grooving. A process may be represented as the "program part" as described above.

There is a case where after processes N1 to N18 are executed in turn and execution of the process N18 is completed, re-execution of only a process N14 is wanted. For example, in a case where the process N14 is semi-finish machining, the process N14 may be re-executed when the accuracy of semi-finish machining of a workpiece after execution of the process N18 is insufficient. In this case, an operator can instruct re-execution of the process N14 after specifying a sequence number N14 from the information processing device 118. It is assumed here that a current pattern in the process N18 is a tool pattern (V6), and a tool pattern (V10) is be set in the process N14.

A restoring code may be described in advance at the beginning of a program part of the process N14. For example, a restoring code "GY V10" is described at the beginning of the program part of the process N14. By describing a machining program in this manner, when an operator instructs re-execution of the process N14, the tool pattern (V10) associated with the process N14 is reproduced as a current pattern, and semi-finish machining is then started. That is, regardless of a tool pattern immediately before the process N18 (at the end of a process N17), the tool pattern (V10) associated with the process N14 is reproduced when the process N14 is re-executed.

The tool information management unit 130 may associate a tool pattern with each process in advance. For example, the tool information management unit 130 associates the tool pattern (V10) with the process N14 as setting information. When re-execution of the process N14 is instructed by an operator, the tool information management unit 130 may refer to the setting information and instruct the machining control unit 116 to reproduce the tool pattern (V10). The machining control unit 116 reproduces the tool pattern (V10), and then re-executes the process N14 in accordance with a machining program.

An operator may set a tool pattern manually. For example, when instructing execution of a process N11, the operator may set a tool pattern (V12) from the input unit 124. In this case, the machining control unit 116 reproduces the tool pattern (V12) as a current pattern, and then executes the process N11. As described above, when the operator instructs execution of any process, the machining control unit 116 may execute the instructed process based on a tool pattern associated with that process or any tool pattern specified by the operator.

Tool change may be performed at any timing regardless of a process. For example, tool change may be instructed by a restoring code at a predetermined timing during execution of a process N13. In this case, any tool pattern can be reproduced as a current pattern by a restoring code. For example, when a process N3 is started with a tool pattern (V4) and restoring a tool pattern (V8) is instructed at the time of completion of 60% of the process N3, the machining control unit 116 reproduces the tool pattern (V8). In this case, the tool pattern (V8) needs not be a tool pattern set immediately before the tool pattern (V4).

CROSS REFERENCE TO RELATED APPLICATIONS

This application is a continuation application of International Application No. PCT/JP2021/020940, filed on Jun. 2, 2021, which claims priority to and the benefit of Japanese Patent Application No. 2020-111067, filed on Jun. 29, 2020. The contents of these applications are incorporated herein by reference in their entirety.

What is claimed is:

1. A machine tool comprising:

a turret having a first station and a second station at each of which a tool is able to be attached;

a tool magazine capable of storing a plurality of tools therein;

a processor for controlling at least one of the tools attached to the turret in accordance with a machining program, to machine a workpiece;

an automatic tool changer for replacing at least one of the tools attached to the turret with one of the plurality of tools stored in the tool magazine storage unit; and a tool pattern memory for memorizing, as a first tool pattern, a combination of tools attached at the first and second stations which is associated with a first part of the machining program and memorizing, as a second tool pattern, a combination of tools attached at the first and second stations which is associated with a second part of the machining program wherein the second part is after the first part, wherein when machining of the workpiece is stopped during execution of the second part, the automatic tool changer performs tool change to reproduce a past tool pattern on the turret, the past tool pattern having been saved to be associated with a part of the machining program executed before the machining of the workpiece is stopped.

2. The machine tool according to claim 1, wherein the machining program includes a station tool code that is a command to memorize at least one of the first tool pattern and the second tool pattern, and when the station tool code is detected during execution of the machining program, the tool pattern memory memorizes a combination of tools attached at the first and second stations as the at least one of the first tool pattern and the second tool pattern.

3. The machine tool according to claim 1, wherein the machining program is one of a plurality of machining programs, and the tool pattern memory memorizes at least one respective tool pattern for each of the plurality of machining programs including the first tool pattern, the second tool pattern, and the past tool pattern.

4. The machine tool according to claim 1, wherein the machining program includes a restoring code that is a command instructing reproduction of a tool pattern, and when the restoring code is detected during execution of the machining program, the automatic attaches tools at the first and second stations of the turret in accordance with a tool pattern specified by the restoring code.

5. A machine tool comprising:

a turret having a first station and a second station at each of which a tool is able to be attached;

a tool magazine capable of storing a plurality of tools therein;

a processor for controlling at least one of the tools attached to the turret in accordance with a machining program, to machine a workpiece; and an automatic tool changer for replacing at least one of the tools attached to the turret with one of the plurality of tools stored in the tool magazine, wherein the machining program includes a station tool code that is a command to memorize a combination of tools attached at the first and second stations as a tool pattern, and in a case where execution of the machining program is interrupted in middle of the machining program and thereafter the machining program is resumed from a point of interruption, the processor reads the station tool code prior to resuming the execution from the point of interruption, and when a combination of tools attached at the first and second stations does not match a past tool pattern having been saved before the point of interruption, the automatic tool changer performs tool change to reproduce the past tool pattern on the turret.

* * * * *